United States Patent
Ono et al.

(10) Patent No.: US 11,598,245 B2
(45) Date of Patent: Mar. 7, 2023

(54) ENGINE SYSTEM

(71) Applicant: Mazda Motor Corporation, Hiroshima (JP)

(72) Inventors: Ryohei Ono, Aki-gun (JP); Yuji Harada, Aki-gun (JP); Kenji Uchida, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/865,704

(22) Filed: Jul. 15, 2022

(65) Prior Publication Data

US 2023/0035987 A1    Feb. 2, 2023

(30) Foreign Application Priority Data

Jul. 30, 2021    (JP) .............................. JP2021-125483

(51) Int. Cl.
*F02B 19/12*    (2006.01)
*F02B 19/10*    (2006.01)
*F02B 1/04*    (2006.01)

(52) U.S. Cl.
CPC ................ *F02B 19/12* (2013.01); *F02B 1/04* (2013.01); *F02B 19/1066* (2013.01)

(58) Field of Classification Search
CPC ......... F02B 19/12; F02B 1/04; F02B 19/1066
See application file for complete search history.

(56) References Cited

U.S. PATENT DOCUMENTS

| 4,287,862 | A  | * | 9/1981 | Noguchi | ................... | F02B 5/00 |
| | | | | | | 123/638 |
| 8,006,666 | B2 | * | 8/2011 | Ashida | .................. | F02B 23/101 |
| | | | | | | 123/638 |
| 11,156,198 | B1 | * | 10/2021 | Glugla | ....................... | F02P 3/05 |
| 2019/0078498 | A1 | * | 3/2019 | Bedogni | ............ | F02B 19/1023 |

FOREIGN PATENT DOCUMENTS

JP    2007255370 A    10/2007

* cited by examiner

*Primary Examiner* — Xiao En Mo
(74) *Attorney, Agent, or Firm* — Alleman Hall Creasman & Tuttle LLP

(57) ABSTRACT

An engine system is provided, which includes a cylinder block, a cylinder head, a piston, a main combustion chamber, a subchamber, an injector that injects fuel into the main combustion chamber, a main spark plug that ignites a mixture gas inside the main combustion chamber, a subspark plug that ignites the mixture gas inside the subchamber, and a controller electrically connected to the injector, the main spark plug and the subspark plug. When an engine load is above a given reference load, the controller controls, in a low-speed range below a given reference engine speed, the ignition devices so that the subignition is performed after the main ignition, and the controller controls, in a high-speed range exceeding the reference engine speed, the ignition devices so that only the subignition is performed, or so that the main ignition is performed at the same timing as or after the subignition.

18 Claims, 9 Drawing Sheets

ENGINE SYSTEM

TECHNICAL FIELD

The present disclosure relates to an engine system provided with a main combustion chamber and a subchamber.

BACKGROUND OF THE DISCLOSURE

Engines provided with a main combustion chamber using a cylinder, and a subchamber which communicates with the main combustion chamber are known. For example, JP2007-255370A discloses an engine where a fuel injection device and a spark plug are disposed at both the main combustion chamber and the subchamber. According to this engine, unburnt mixture gas which exists in the main combustion chamber combusts by combusting a mixture gas inside the main combustion chamber, and then combusting the mixture gas inside the subchamber to blow off flame inside the subchamber to the main combustion chamber. Therefore, the unburnt mixture gas remaining inside the main combustion chamber can be suppressed, and as a result, fuel efficiency and emission performance can be improved.

Unlike the engine of JP2007-255370A, if a configuration in which the fuel injection device is disposed only at the main combustion chamber for the purpose of simplifying the structure is adopted, it may become difficult for the mixture gas to be introduced into the subchamber. For example, in a low-speed high-load operating range of the engine, the supply of the flame from the subchamber may become insufficient, and the combustion of the unburnt mixture gas may become inadequate. In addition, in a high-speed high-load operating range, there is a problem in which knocking tends to occur in the main combustion chamber. As a result, an improvement effect of fuel efficiency and emission performance which is acquired by providing the subchamber in addition to the main combustion chamber, may not fully be demonstrated.

SUMMARY OF THE DISCLOSURE

One purpose of the present disclosure is to provide an engine system provided with a main combustion chamber and a subchamber, capable of securely improving fuel efficiency and emission performance.

According to one aspect of the present disclosure, an engine system is provided, which includes a cylinder block and a cylinder head that form a cylinder, a piston reciprocatably accommodated in the cylinder, a main combustion chamber defined by the cylinder block, the cylinder head, and the piston, a subchamber that is divided from the main combustion chamber by a partition, and communicates with the main combustion chamber through a communicating hole formed in the partition, an injector that injects fuel into the main combustion chamber, a main spark plug that performs main ignition for igniting a mixture gas inside the main combustion chamber, a subspark plug that performs subignition for igniting the mixture gas inside the subchamber, and a controller that is electrically connected to, and outputs an electric signal for control to, the injector, the main spark plug, and the subspark plug. When the engine is operated in a high-load range where an engine load is above a given reference load, the controller controls, in a low-speed range where an engine speed is below a given reference engine speed, the main spark plug and the subspark plug so that the subignition is performed after the main ignition, and, the controller controls, in a high-speed range where the engine speed exceeds the reference engine speed, only the subspark plug to perform the subignition, or controls the main spark plug and the subspark plug so that the main ignition is performed at the same timing as or after the subignition.

In the high-load low-speed operating range, the force of pushing the mixture gas into the subchamber becomes weaker because the piston moves slowly. Thus, a flow of the mixture gas inside the subchamber becomes slower, and the combustion speed inside the subchamber becomes slower as well. As a result, the flame blown off from the subchamber tends to become weaker. According to this configuration, in the high-load low-speed operating range, the main ignition is performed first, and then the subignition is performed. Therefore, an inflow of the mixture gas into the subchamber is stimulated. That is, when the combustion pressure of the flame propagation combustion caused by the main ignition overlaps with the pushing force of the piston, the force of pushing the mixture gas into the subchamber increases. Therefore, the flow of the mixture gas inside the subchamber becomes faster, and the combustion speed inside the subchamber becomes faster as well. As a result, the powerful flame can be blown off from the subchamber, and therefore, unburnt mixture gas which remains inside the main combustion chamber can be combusted appropriately. On the other hand, in the high-load high-speed operating range, knocking tends to occur in the main combustion chamber. According to this configuration, in the high-load high-speed operating range, the subignition is precedingly performed to make the flame blow off from the subchamber. Thus, the combustion inside the main combustion chamber is made earlier, and therefore, the knocking can be suppressed.

In the low-speed range, the controller may retard the timing of the subignition as the engine speed becomes lower.

As the engine speed becomes lower, the pushing force of the piston tends to become weaker and it tends to become more difficult for the mixture gas to be introduced into the subchamber. According to this configuration, since the timing of the subignition is retarded as the engine speed becomes lower, the time for pushing the mixture gas into the subchamber can be secured fully according to the engine speed.

In the high-speed range, the controller may advance the timing of the subignition as the engine speed becomes higher.

As the engine speed becomes higher, knocking tends to occur more easily. According to this configuration, since the subignition timing is advanced as the engine speed becomes higher, the combustion speed can be increased, and therefore, knocking can be suppressed.

In the low-speed range, the controller may set an ignition phase difference between the subignition and the main ignition to be larger as the engine speed becomes lower.

According to this configuration, since the ignition phase difference becomes larger as the engine speed becomes lower, the time for pushing the mixture gas into the subchamber can be secured fully according to the engine speed.

The main spark plug may be attached so that an electrode part thereof is located on an intake port side in a ceiling surface of the main combustion chamber, and the subspark plug may be attached to a position on an exhaust port side in the ceiling surface of the main combustion chamber.

The injector may be disposed so that a tip-end part thereof is located at the center of the ceiling surface of the main combustion chamber.

DETAILED DESCRIPTION OF THE DISCLOSURE

Hereinafter, an engine system according to one embodiment of the present disclosure is described in detail with reference to the accompanying drawings. In this embodiment, a case where the engine system is mounted on a vehicle (e.g., an automobile) as a power source for propelling the vehicle is illustrated.

Entire Configuration of Engine

Figure 1:
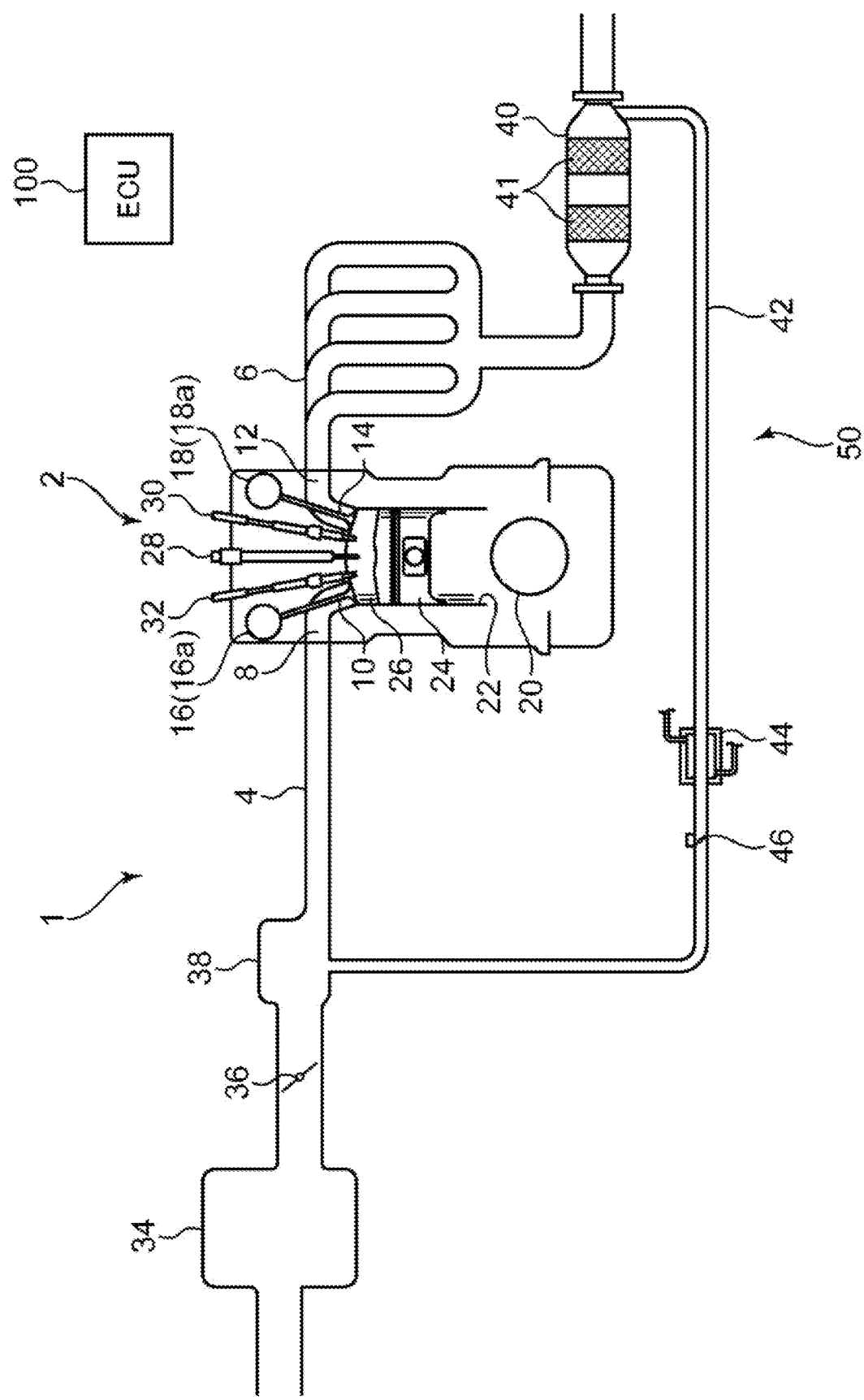
FIG. 1 is an outline block diagram of an engine system according to one embodiment of the present disclosure.

FIG. 1 is an outline block diagram of an engine system 1 according to this embodiment of the present disclosure. The engine system 1 includes an engine body 2, an intake passage 4 through which air introduced into the engine body 2 (intake air) circulates therein, an exhaust passage 6 through which exhaust gas drawn from the engine body 2 circulates therein, and an exhaust gas recirculation (EGR) system 50. The engine body 2 is a four-stroke gasoline engine which mainly uses gasoline as fuel, and fuel containing gasoline is supplied to the engine body 2.

Figure 2:
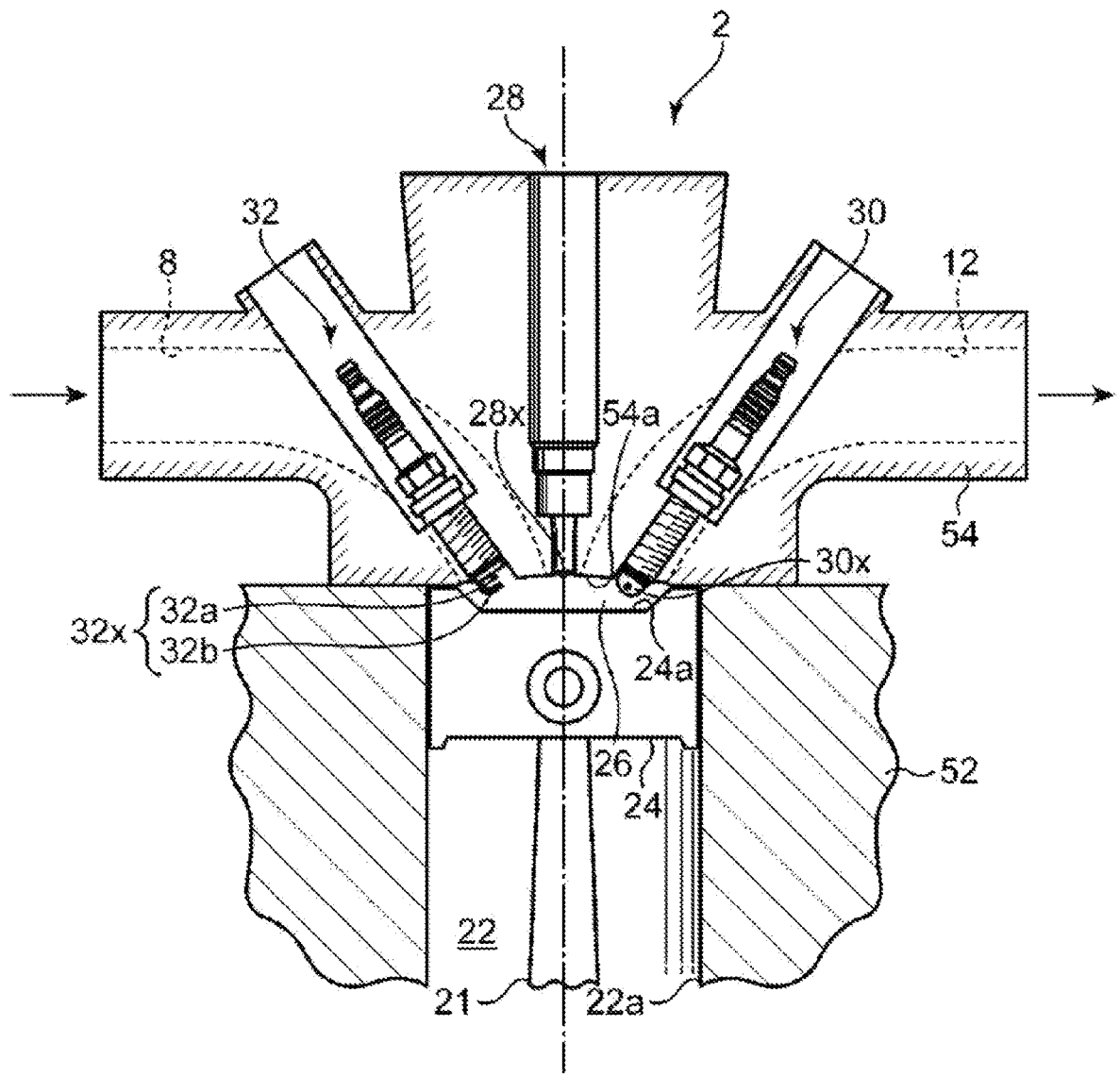
FIG. 2 is an outline cross-sectional view of an engine body.

FIG. 2 is an outline cross-sectional view of the engine body 2. The engine body 2 is a multi-cylinder engine having a plurality of cylinders 22. For example, the engine body 2 has four cylinders 22 lined up single file (lined up in a direction perpendicular to the drawing sheet in FIG. 1). The engine body 2 includes a cylinder block 52, a cylinder head 54, and a plurality of pistons 24. The cylinder 22 is formed by the cylinder block 52 and the cylinder head 54. Inside the cylinder block 52, a plurality of cylindrical spaces which form a plurality of cylinders 22 are provided. The cylinder head 54 has a bottom surface 54a which closes upper-end openings of the cylindrical spaces, and is attached to an upper surface of the cylinder block 52. The pistons 24 are reciprocatably accommodated in the respective cylinders 22. Note that, in this embodiment, a direction from the cylinder block 52 toward the cylinder head 54 is treated as "upward" and the opposite direction is treated as "downward." These are to facilitate the explanation and are not intended to limit the installation posture of the engine body 2.

A space used as a main combustion chamber 26 is formed above the piston 24 of each cylinder 22. The main combustion chamber 26 is defined by an inner circumferential surface 22a of the cylinder 22 formed in the cylinder block 52, the bottom surface 54a of the cylinder head 54, and a crown surface 24a of the piston 24. Fuel is supplied to the main combustion chamber 26 by injection from an injector 28 (described later). A mixture gas comprised of the supplied fuel and air combusts inside the main combustion chamber 26, and the piston 24 reciprocates in the up-and-down direction by receiving the expansion force of the combustion.

A crankshaft 20 which is an output shaft of the engine body 2 is provided to a lower part of the cylinder block 52 (below the piston 24). The crankshaft 20 is coupled to the piston 24 of each cylinder 22 via a connecting rod 21, and rotates on the center axis according to the reciprocating movement of the piston 24.

In the cylinder head 54, an intake port 8 and an exhaust port 12 are formed for every cylinder 22. The intake port 8 is a port for introducing the air supplied from the intake passage 4 into the main combustion chamber 26. The exhaust port 12 is a port for deriving the exhaust gas generated inside the main combustion chamber 26 to the exhaust passage 6. An intake valve 10 is provided to open and close an opening of the intake port 8 on the main combustion chamber 26 side. An exhaust valve 14 is provided to open and close an opening of the exhaust port 12 on the main combustion chamber 26 side. In this embodiment, two intake valves 10 and two exhaust valves 14 are provided to each cylinder 22.

The intake valve 10 and the exhaust valve 14 are opened and closed by respective valve operating mechanisms 16 and 18 disposed at the cylinder head 54 in an interlocked fashion with the rotation of the crankshaft 20. The valve operating mechanism 16 for the intake valves 10 is provided with variable valve lift mechanism (intake S-VT) 16a which is electrically controlled so as to change valve lifts and opening-and-closing timings of the intake valves 10. Similarly, the valve operating mechanism 18 for the exhaust valves 14 is provided with a variable valve lift mechanism (exhaust S-VT) 18a which is electrically controlled so as to change valve lifts and opening-and-closing timings of the exhaust valves 14.

The cylinder head 54 is provided with a set of the injector 28, a main spark plug 32, and a subignition unit 30 for each cylinder 22. The injector 28 is an injection valve which injects fuel into the main combustion chamber 26. An injection port through which fuel is injected is formed in a tip-end part 28x of the injector 28. The injector 28 is attached to the cylinder head 54 so that its tip-end part 28x faces the main combustion chamber 26 from above. The injector 28 is disposed so that its tip-end part 28x is located at the center of a ceiling surface of the main combustion chamber 26 (in more detail, located on the axis of the cylinder 22).

The main spark plug 32 performs a main ignition for igniting the mixture gas inside the main combustion chamber 26 by spark discharge. An electrode part 32x for discharging sparks is provided to a tip end of the main spark plug 32. The electrode part 32x includes a center electrode 32a, and a side electrode 32b for the ground. The main spark plug 32 is attached to the cylinder head 54 so that its electrode part 32x faces the main combustion chamber 26 from above. The main spark plug 32 is disposed so that the electrode part 32x is located in the ceiling surface of the main combustion chamber 26, on the intake port 8 side with respect to the tip-end part 28x of the injector 28.

The subignition unit 30 is a device for injecting flame into the main combustion chamber 26. The subignition unit 30 will be explained in detail later.

The intake passage 4 is connected to one of a plurality of side surfaces of the cylinder head 54 so as to communicate with the intake port 8 of each cylinder 22. The intake passage 4 is provided with, sequentially from an upstream side, an air cleaner 34 which removes foreign matter contained in intake air, an openable and closable throttle valve 36 which adjusts a flow rate of intake air, and a surge tank 38. A downstream end of the intake passage 4 branches to a plurality of passages, and these branched passages are connected to the respective intake ports 8. In each cylinder 22, a swirl valve 56 (see FIG. 5) is provided to the branch passage connected to one of the two intake ports 8 to open and close this intake port 8.

The exhaust passage 6 is connected to one of the plurality of side surfaces (the side surface opposite from the intake passage 4) of the cylinder head 54 so as to communicate with the exhaust port 12 of each cylinder 22. The exhaust passage 6 is provided with a catalyst device 40 having a built-in catalyst 41, such as a three-way catalyst.

The EGR system 50 is a device for recirculating part of the exhaust gas to the intake passage 4 as EGR gas. The EGR system 50 has an EGR passage 42 which communicates the exhaust passage 6 with the intake passage 4, and an EGR valve 46 and an EGR cooler 44 which are provided to the EGR passage 42. An upstream end of the EGR passage 42 is connected to a downstream end of the catalyst device 40 which is a part of the exhaust passage 6 downstream of the catalyst 41. A downstream end of the EGR passage 42 is connected to the surge tank 38. The EGR valve 46 is a valve which opens and closes the EGR passage 42 to adjust a flow rate of EGR gas. The EGR cooler 44 is a heat exchanger for cooling EGR gas. The EGR cooler 44 is disposed upstream of the EGR valve 46.

Details of Subignition Unit

Figure 3:
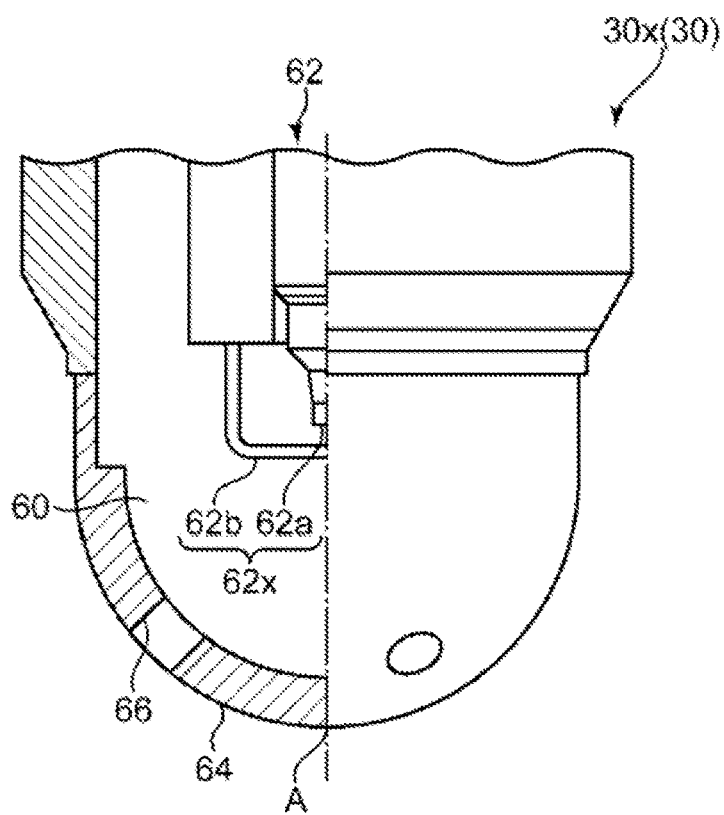
FIG. 3 is a partial cross-sectional view of a tip-end part of a subignition unit when seen from the side.
Figure 4:
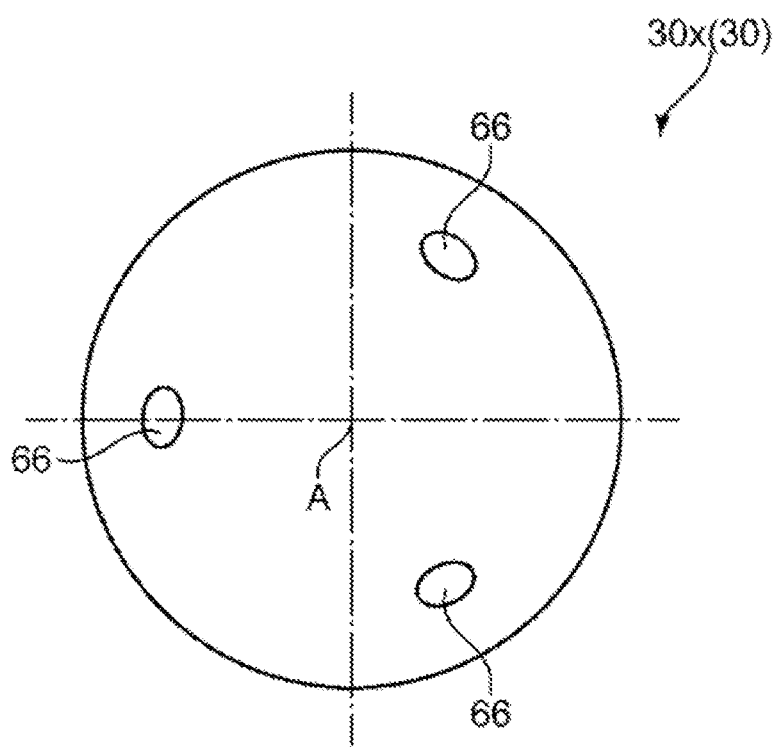
FIG. 4 is a plan view of the tip-end part of the subignition unit.

FIG. 3 is a partial cross-sectional view of a tip-end part 30x of the subignition unit 30 when seen from the side, and FIG. 4 is a plan view of the tip-end part 30x when seen from below. The subignition unit 30 includes a subspark plug 62, a cover member 64 (partition) attached to a tip end of the subspark plug 62, and a subchamber 60 which is an interior space covered with the cover member 64.

The subspark plug 62 performs subignition for igniting the mixture gas inside the subchamber 60 by spark discharge. A tip end of the subspark plug 62 is provided with an electrode part 62x which discharges sparks. The electrode part 62x includes a center electrode 62a and a side electrode 62b for the ground. The cover member 64 constitutes the tip-end part 30x of the subignition unit 30, and surrounds the electrode part 62x of the subspark plug 62. The cover member 64 has a semi-spherical shape which bulges downwardly. The subchamber 60 is a space inside the cover member 64. In detail, the subchamber 60 is a space around and near the electrode part 62x of the subspark plug 62, which is defined by the cover member 64. Since it is such a space, the size of the subchamber 60 is narrow, compared with the main combustion chamber 26. The electrode part 62x of the subspark plug 62 is disposed so as to face the subchamber 60, and therefore, it is possible of the subignition described above.

As illustrated in FIG. 2, the subignition unit 30 is attached to the cylinder head 54 so that its tip-end part 30x faces the main combustion chamber 26 from above. The subignition unit 30 is attached to a position in the ceiling surface of the main combustion chamber 26 (the bottom surface 54a of the cylinder head 54) on the exhaust port 12 side with respect to the injector 28. In this attaching state, a substantially entire part of the cover member 64 is located inside the main combustion chamber 26. As a result, the cover member 64 serves as a partition which separates the subchamber 60 from the main combustion chamber 26.

A plurality of communicating holes 66 are formed in the cover member 64 so that they penetrate the cover member 64 and communicate with the main combustion chamber 26. The subchamber 60 which is an internal space of the cover member 64 communicates with the main combustion chamber 26 via these communicating holes 66. In this embodiment, one example in which three communicating holes 66 are formed in the cover member 64 is illustrated. As illustrated in FIG. 4, the three communicating holes 66 are disposed at an interval of 120° around the axis of the cover member 64 which passes through a vertex A of the cover member 64. Further, as illustrated in FIG. 3, each communicating hole 66 is obliquely disposed, in a side view, at a position about 45° from the vertex A. In this embodiment, the radius of the cover member 64 is 5 mm, the thickness is 1 mm, and the diameter of each communicating hole 66 is 1.2 mm.

The subignition unit 30 having the configuration described above functions as a device for injecting flame into the main combustion chamber 26. When fuel is injected into the main combustion chamber 26 from the injector 28, and the mixture gas comprised of air and fuel is formed inside the main combustion chamber 26, a part of this mixture gas is introduced into the subchamber 60 via the communicating holes 66. When the spark discharge (subignition) is performed by the sub spark plug 62 in a state where a sufficient amount of the mixture gas exists inside the subchamber 60, the mixture gas begins combustion inside the subchamber 60 and flame propagates from near the electrode part 62x of the subspark plug 62 to the circumference. Then, this flame is blown off to the main combustion chamber 26 via the communicating holes 66, and propagates to the mixture gas inside the main combustion chamber 26.

Here, when the main ignition is performed to the mixture gas inside the main combustion chamber 26 by the main spark plug 32, the flame propagates to the circumference also from near the electrode part 32x of the main spark plug 32. Thus, when the ignition is performed by both the main spark plug 32 and the subspark plug 62, and the mixture gas begins the combustion appropriately inside the main combustion chamber 26 and the subchamber 60, the flame propagates to the mixture gas inside the main combustion chamber 26 from a plurality of positions (the positions of the electrode part 32x and the communicating holes 66). Therefore, the combustion speed of the mixture gas inside the main combustion chamber 26 is increased, fuel efficiency is improved, and the occurrence of knocking is suppressed.

Control System

Figure 5:
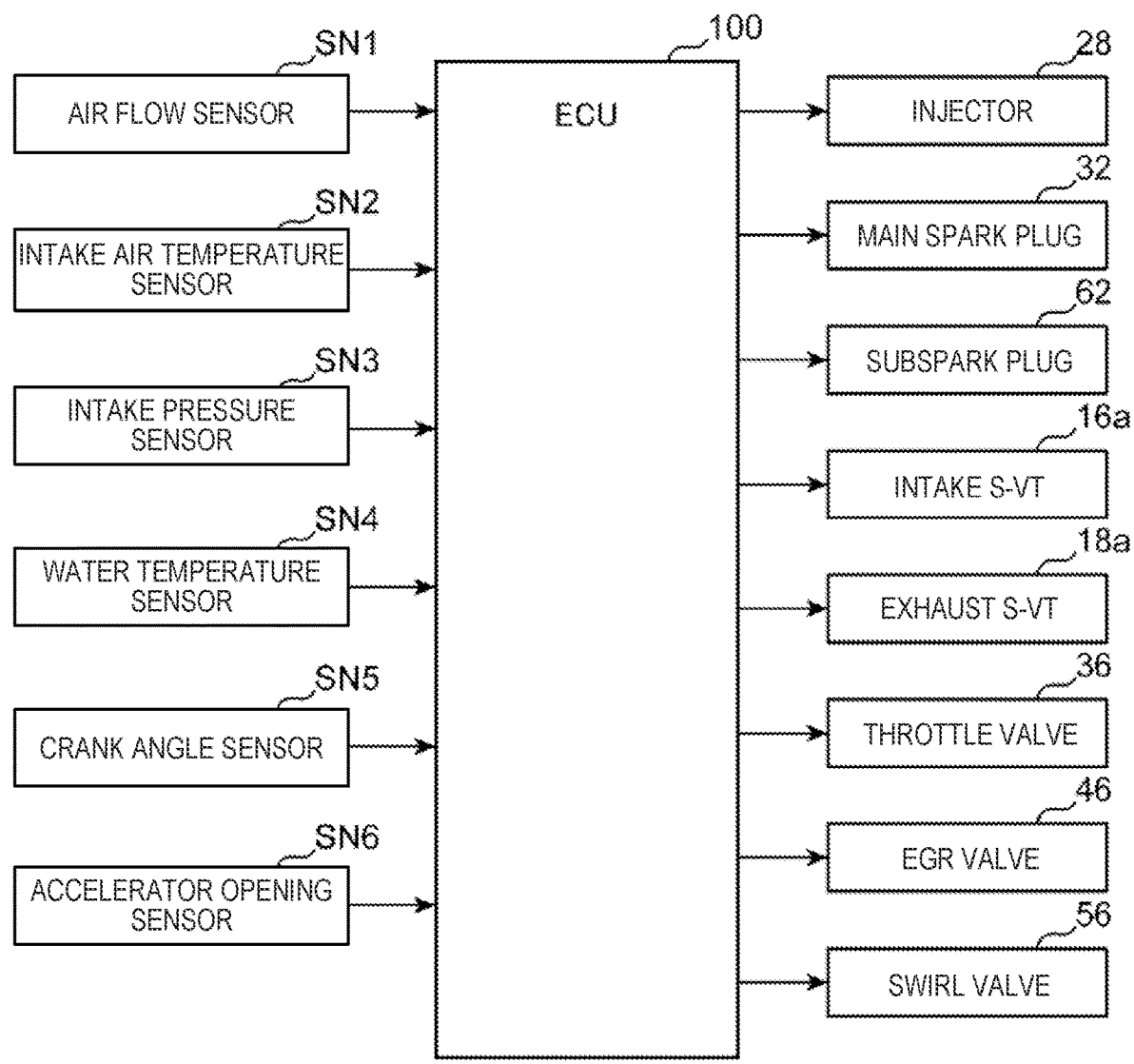
FIG. 5 is a block diagram illustrating a control configuration of the engine system.

FIG. 5 is a block diagram illustrating a control system of the engine system 1. The engine system 1 includes an electronic control unit (ECU) 100 (controller) which comprehensively controls function parts provided to the engine system 1. The ECU 100 is electrically connected to the injector 28, the main spark plug 32, the subspark plug 62, etc. which are described above, and outputs an electric signal for control to each of these devices. The ECU 100 is comprised of a microcomputer including a processor (e.g., a central processing unit (CPU)) which performs various calculation processings, memory such as a ROM and a RAM, and various kinds of input and output buses.

Detection information by the various sensors are inputted into the ECU 100. The ECU 100 carries out various determinations, calculations, etc. based on the inputted information from the various sensors, and controls each part of the engine. Detection values of an air flow sensor SN1, an intake air temperature sensor SN2, an intake pressure sensor SN3, a water temperature sensor SN4, and a crank angle sensor SN5, which are provided to the engine system 1, and an accelerator opening sensor SN6 provided to the vehicle, are inputted into the ECU 100.

The air flow sensor SN1 detects a flow rate of intake air which passes through the intake passage 4 and is introduced into the engine body 2. The intake air temperature sensor SN2 and the intake pressure sensor SN3 detect a temperature and a pressure of intake air introduced into the engine body 2, respectively. The water temperature sensor SN4 detects a temperature of engine coolant for cooling the engine body 2. The crank angle sensor SN5 detects a crank angle which is a turning angle of the crankshaft 20, and an engine speed. The accelerator opening sensor SN6 detects an accelerator opening which is an opening of an accelerator pedal (not illustrated) provided to the vehicle.

Figure 6:
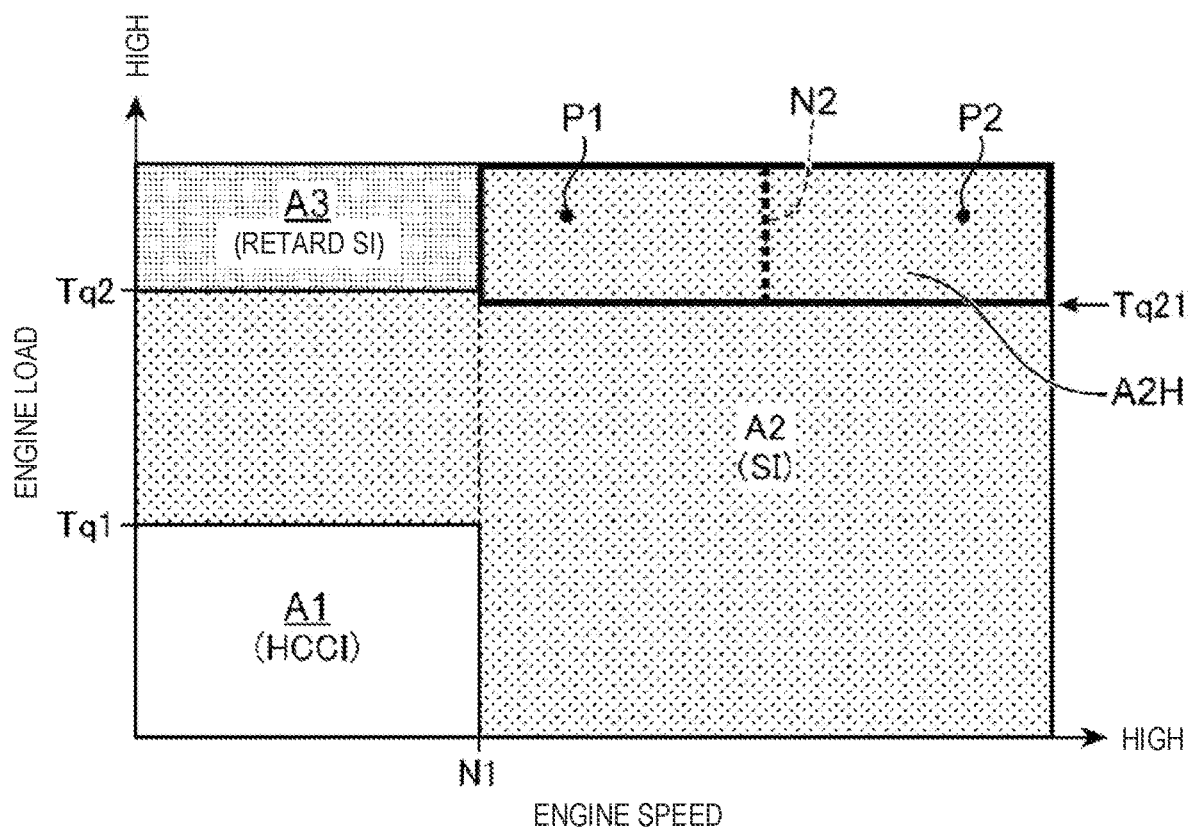
FIG. 6 is a map illustrating an operating range of the engine.

FIG. 6 is a map illustrating an operating range of the engine, where the horizontal axis is an engine speed and the vertical axis is an engine load. The operating range of the engine is roughly divided into three ranges A1-A3 (a first range A1, a second range A2, and a third range A3) according to the control content of the injector 28, the main spark plug 32, and the subspark plug 62.

The first range A1 is a low-speed low-load range where the engine speed is below a given first speed N1 and the engine load is below a given first load Tq1. The third range A3 is a low-speed high-load range where the engine speed is below the first speed N1 and the engine load is above a given second load Tq2. The second range A2 is a range other than the first range A1 and the third range A3. That is, the second range A2 is comprised of a range where the engine speed is below the first speed N1, and the engine load is above the first load Tq1 and below the second load Tq2, and a range where the engine speed is above the first speed N1.

In the first range A1, the injector 28, the main spark plug 32, and the subspark plug 62 are controlled so that HCCI (Homogeneous Compression Charge Ignition) combustion is realized. In detail, fuel is injected from the injector 28 in intake stroke. In addition, igniting operations of the main spark plug 32 and the subspark plug 62 are suspended.

The injector 28 is disposed so as to face the main combustion chamber 26, and fuel injected from the injector 28 is diffused throughout the main combustion chamber 26. Thus, in the first range A1, since fuel is injected from the injector 28 in intake stroke, fuel and air can be fully mixed inside the main combustion chamber 26 by reaching a compression top dead center (TDC). In the first range A1, this fully-mixed mixture gas (premixed mixture gas) self-ignites near the compression TDC when it is increased in the temperature and the pressure by the compression of the piston 24. In the HCCI combustion, an air-fuel ratio of the mixture gas is made leaner (higher) to a level where flame propagation is impossible, and therefore, fuel efficiency can be improved. Therefore, in the first range A1, the opening of the throttle valve 36 is adjusted so that the air-fuel ratio of the mixture gas inside the main combustion chamber 26 becomes leaner than the theoretical air-fuel ratio (14.7:1).

In the second range A2, the injector 28, the main spark plug 32, and the subspark plug 62 are controlled so that flame propagation combustion (spark ignition (SI) combustion) is realized. In the second range A2, fuel is injected from the injector 28 in intake stroke, similar to the first range A1. On the other hand, in the second range A2, the main spark plug 32 and the subspark plug 62 are activated so that the main ignition and the subignition are performed by both the spark plugs 32 and 62. Further, the opening of the throttle valve 36 is adjusted so that the air-fuel ratio of the mixture gas inside the main combustion chamber 26 becomes near the theoretical air-fuel ratio. In the second range A2, a flame kernel is generated around each of the electrode parts $32x$ and $62x$ by the main ignition by the main spark plug 32 and the subignition by the subspark plug 62. Since the flame propagates from these flame kernels to the circumference, the mixture gas inside the main combustion chamber 26 and the subchamber 60 combust.

In the third range A3, the injector 28, the main spark plug 32, and the subspark plug 62 are controlled so that retarded SI combustion in which the fuel injection timing is retarded from the second range A2 is realized. In the third range A3, fuel is injected from the injector 28 in compression stroke, not in intake stroke. This is because preignition in which the mixture gas self-ignites before the main ignition may occur if the fuel injection is performed during intake stroke in the low-speed high-load third range A3.

In this embodiment, a specific ignition control is performed in a specific range A2H of the second range A2. The specific range A2H is a high-speed high-load operating range where the engine speed is above the first speed N1 and the engine load is above a boundary load Tq21 (given reference load). In the specific range A2H, the ECU 100 performs different ignition controls bordering on a given second speed N2 (given reference engine speed) above the first speed N1.

In a low-speed range below the second speed N2 (for example, an operating point P1 in FIG. 6), the ECU 100 makes the main spark plug 32 perform the main ignition, and then makes the subspark plug 62 perform the subignition. That is, in the low-speed range of the specific range A2H, the control in which the main ignition is performed prior to the subignition is carried out. On the other hand, in a high-speed range of the specific range A2H (for example, an operating point P2), a control in which the subignition is treated so as to precede the main ignition is carried out. In detail, in the high-speed range, the ECU 100 carries out a control selected from three patterns comprised of:

Pattern A: Performing only the subignition;

Pattern B: Performing the subignition and the main ignition at the same timing; and Pattern C: Performing the subignition, and the main ignition which is performed at a timing after the subignition.

In the comparatively low-speed operating range (operating point P1) of the high-load specific range A2H, the force of stuffing the mixture gas into the subchamber 60 becomes weaker because the reciprocating motion of the piston 24 is comparatively slow. Thus, a flow of the mixture gas inside the subchamber 60 becomes slower, and the combustion speed inside the subchamber 60 becomes slower as well. As a result, the flame blown off from the subchamber 60 tends to become weaker. Regarding this, in the high-load low-speed operating range, the ECU 100 performs the main ignition, and then performs the subignition. Therefore, an inflow of the mixture gas into the subchamber 60 is stimulated. That is, when the combustion pressure of the flame propagation combustion caused by the main ignition overlaps with the pushing force of the piston 24, the force of pushing the mixture gas into the subchamber 60 increases. Therefore, the flow of the mixture gas inside the subchamber 60 becomes faster, and the combustion speed inside the subchamber 60 becomes faster as well. As a result, the powerful flame can be blown off from the subchamber 60 through the communicating holes 66, and therefore, unburnt mixture gas which remains inside the main combustion chamber 26 can be combusted appropriately.

On the other hand, in the comparatively high-speed operating range (operating point P2) of the specific range A2H, knocking tends to occur in the main combustion chamber 26. Regarding this fact, in the high-load high-speed operating range, the ECU 100 precedingly performs the subignition to make the flame blow off from the subchamber 60. For example, it performs only the subignition at a given timing (Pattern A) to carry out SI combustion of all the mixture gas inside the main combustion chamber 26 by the flame blown off from the subchamber 60. Alternatively, it performs the main ignition at the same timing as the subignition (Pattern B) to make the flame blow off from the subchamber 60 and form the flame kernel around the electrode part 32x of the main spark plug 32 so that SI combustion of the mixture gas inside the main combustion chamber 26 is carried out. Alternatively, it precedingly performs the subignition and then performs the main ignition (Pattern C) to precedingly carry out the SI combustion of the mixture gas inside the main combustion chamber 26 by the flame from the subchamber 60, and combust the remaining mixture gas by the main ignition of the main spark plug 32. By one of these controls, the combustion inside the main combustion chamber 26 is made earlier, and therefore, knocking can be suppressed.

CONCRETE EXAMPLE CONTROL IN SPECIFIC RANGE

Figure 7:
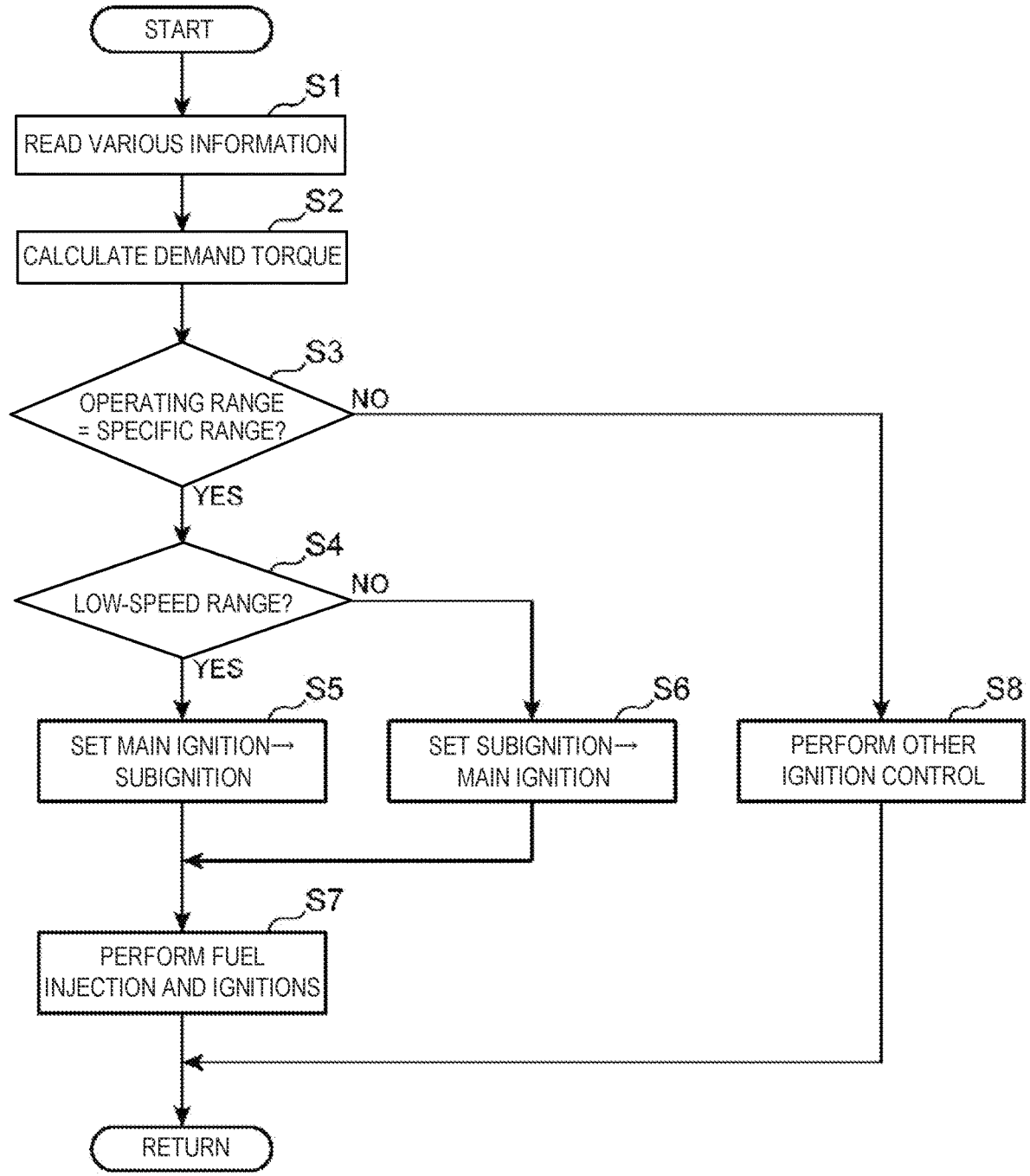
FIG. 7 is a flowchart illustrating one example of a control of a fuel injection and ignitions which is performed when the operating range is a specific range.

Next, a concrete example control in the specific range A2H is described. FIG. 7 is a flowchart illustrating one example of the fuel injection control of the injector 28, and the ignition control of the main spark plug 32 and the subspark plug 62 which are performed by the ECU 100 when the operating range falls within the specific range A2H. Here, in the high-speed range (operating point P2) of the specific range A2H, one example in which the control of "Pattern C" is performed is illustrated.

If a given sampling period comes, the ECU 100 reads the variety of information from the various sensors SN 1-6 illustrated in FIG. 5, and other sensors (Step S1). For the fuel injection control and ignition control described above, the ECU 100 reads the engine speed detected by the crank angle sensor SN5, and the opening of the accelerator pedal detected by the accelerator opening sensor SN6.

Next, the ECU 100 calculates a demand torque which is a torque demanded for the engine body 2 (i.e., engine load) (Step S2). The ECU 100 calculates the demand torque (engine load) based on the engine speed and the opening of the accelerator pedal which are read at Step S1.

Next, the ECU 100 determines whether the operating point of the engine body 2 falls within the specific range A2H of the second range A2 (see the operation map in FIG. 6) (Step S3). In detail, the ECU 100 determines whether the current operating point of the engine is a point in the specific range A2H based on the engine speed read at Step S1 and the engine load calculated at Step S2.

If the operating point of the engine body 2 is not a point in the specific range A2H (NO at Step S3), the ECU 100 performs a control according to other operating ranges (i.e., the fuel injection control and the ignition control which are set beforehand for the first range A1, the third range A3, or a range of the second range A2 other than the specific range A2H) (Step S8). On the other hand, if the operating point of the engine body 2 is a point in the specific range A2H (YES at Step S3), the ECU 100 performs processings of Steps S4-S7. These processings set a fuel injection timing which is a timing at which the injector 28 begins the fuel injection, a main ignition timing which is a timing at which the main spark plug 32 performs the ignition (spark discharge), and a subignition timing which is a timing at which the subspark plug 62 performs the ignition (spark discharge).

At Step S4, the ECU 100 determines whether the operating point of the engine body 2 falls within the low-speed range of the specific range A2H (Step S4). If the operating point falls within the low-speed range (for example, the operating point P1) below the second speed N2, of the specific range A2H (YES at Step S4), the ECU 100 sets the main ignition timing and the subignition timing so that the subignition is performed after performing the main ignition (Step S5).

On the other hand, if the operating point falls within the high-speed range (for example, the operating point P2) exceeding the second speed N2, of the specific range A2H (NO at Step S4), the ECU 100 sets the main ignition timing and the subignition timing so that the main ignition is performed after performing the subignition (Step S6). Note that the fuel injection timing is set at a given timing in intake stroke, in either the high-speed range or the low-speed range.

Then, the ECU 100 activates the injector 28 so that the fuel injection is started at the set fuel injection timing. Further, the ECU 100 activates the main spark plug 32 so that the main ignition is performed at the main ignition timing set at Step S5 or S6, and activates the subspark plug 62 so that the subignition is performed at the subignition timing set at Step S5 or S6 (Step S7). Note that, in an actual control, a control map in which the fuel injection timing, the main ignition timing, and the subignition timing are associated with the engine load and the engine speed is stored beforehand in a storage area of the ECU 100, and the fuel injection timing and the ignition timings are set with reference to this control map.

Figure 8:
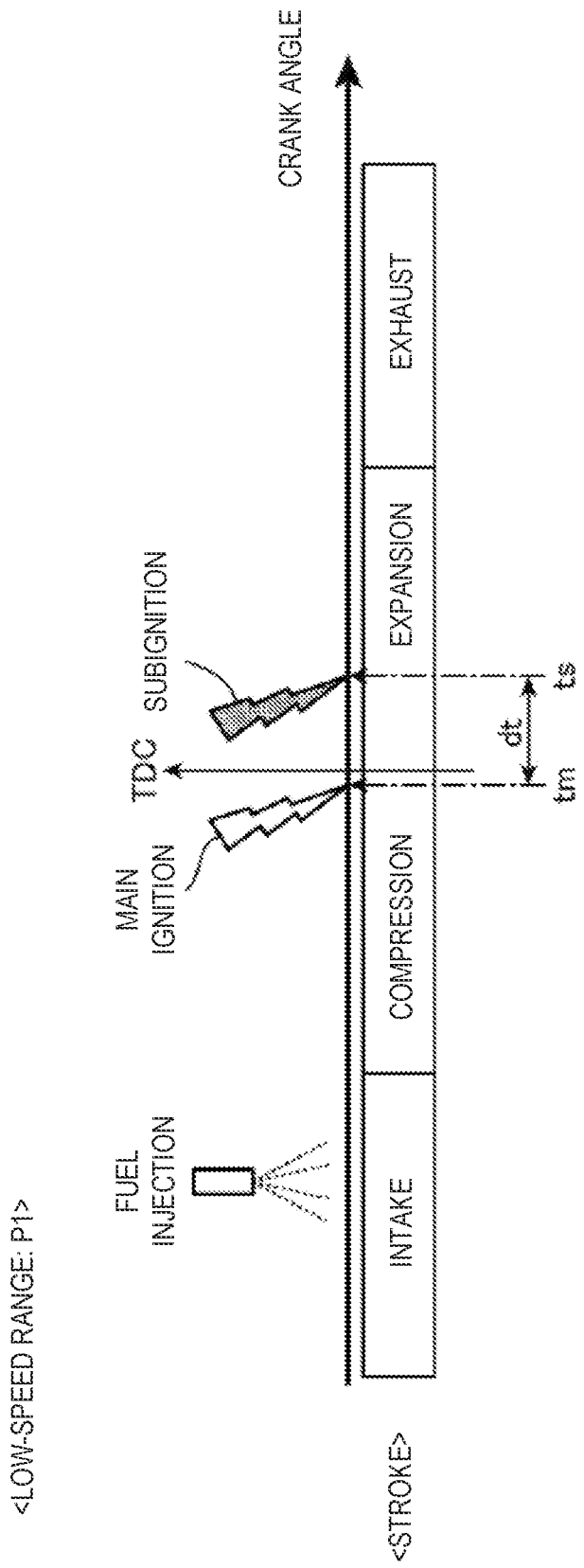
FIG. 8 is a time chart illustrating a fuel injection timing, a main ignition timing, and a subignition timing in a low-speed range of the specific range.

FIG. 8 is a time chart illustrating a fuel injection timing, a main ignition timing tm, and a subignition timing ts at the operating point P1 in the low-speed range of the specific range A2H. The fuel injection timing in the low-speed range is during intake stroke. In detail, a start timing and an end timing of the fuel injection from the injector 28 are set so that they are included in intake stroke. This is because, in the specific range A2H, the demand for retarding the fuel injection timing in order to suppress the preignition like in the third range A3, is less. Note that the end timing of the fuel injection may be included in compression stroke.

In the low-speed range of the specific range A2H, the main ignition timing tm is set on the advance side of the subignition timing ts, as described at Step S5 in FIG. 7. That is, the main ignition by the main spark plug 32 is first performed, and the subignition by the subspark plug 62 is then performed. The main ignition timing tm is set in compression stroke slightly on the advance side of the compression TDC, and the subignition timing ts is set in the first half of expansion stroke. SI combustion of the mixture gas inside the main combustion chamber 26 begins by the main ignition which is precedingly performed near TDC. In the low-speed range, since the reciprocating motion of the piston 24 is comparatively slow, the force of pushing the mixture gas into the subchamber 60 is weak. However, the assistance of the pressure increase accompanying the SI combustion pushes the unburnt mixture gas which remains inside the main combustion chamber 26 into the subchamber 60 through the communicating holes 66. Therefore, the sufficient amount of the mixture gas accompanied by the fast flow is introduced into the subchamber 60.

By the subignition following the main ignition, the mixture gas introduced into the subchamber 60 combusts. As described above, since the flow of the mixture gas inside the subchamber 60 is fast, the combustion speed of the mixture gas after the subignition also becomes faster. As a result, the powerful flame can be blown off from the plurality of communicating holes 66. The flame makes the unburnt mixture gas inside the main combustion chamber 26 combust instantaneously. Therefore, fuel efficiency and emission performance can be improved.

Figure 9:
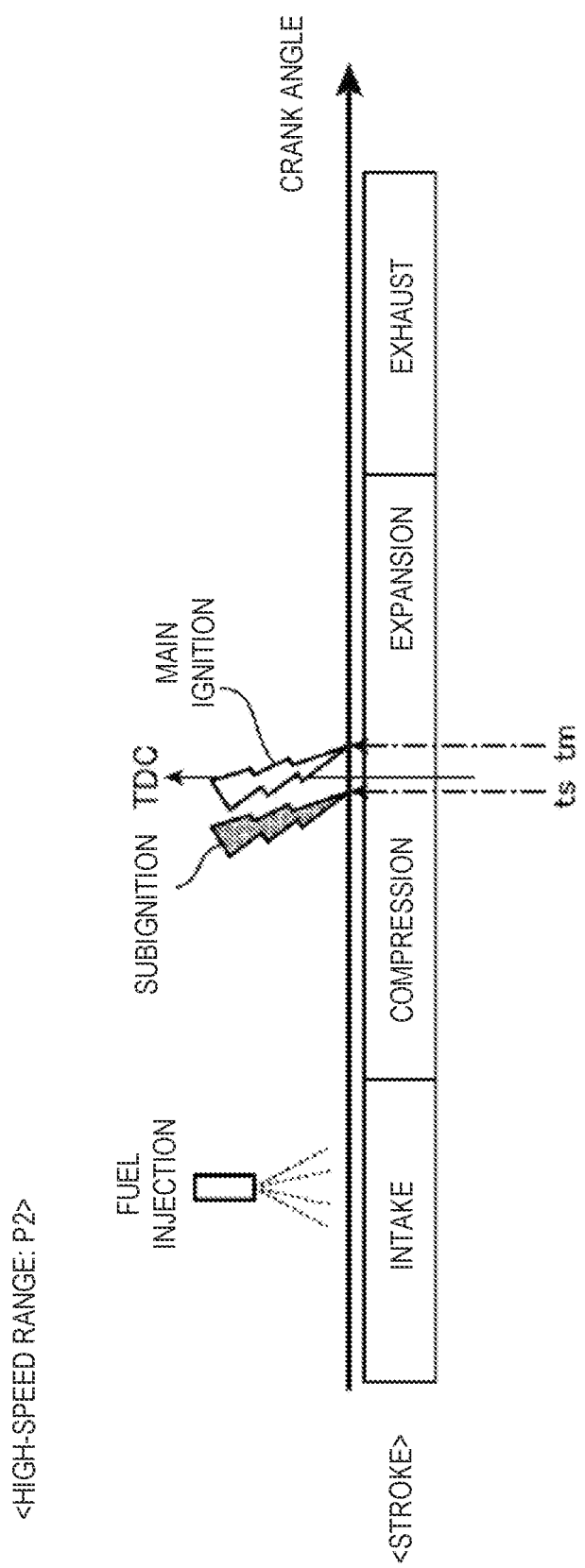
FIG. 9 is a time chart illustrating the fuel injection timing, the main ignition timing, and the subignition timing in a high-speed range of the specific range.

FIG. 9 is a time chart illustrating the fuel injection timing, the main ignition timing tm, and the subignition timing ts at the operating point P2 in the high-speed range of the specific range A2H. The fuel injection timing in the high-speed range is during intake stroke, similar to the low-speed range described above. As described for Step S6 in FIG. 7, as for the ignition timing in the high-speed range, the subignition timing ts is set to a timing on the advance side of the main ignition timing tm. That is, contrary to the low-speed range described above, the subignition by the subspark plug 62 is first performed, and the main ignition by the main spark plug 32 is then performed. The subignition timing ts is a timing near the compression TDC in compression stroke, and the main ignition timing tm is a timing near TDC in expansion stroke.

In the high-speed range, since the reciprocating motion of the piston 24 is comparatively fast, the mixture gas is more easily introduced into the subchamber 60. Thus, even if the subignition is precedingly performed, a misfire occurring is rare. By the subignition, the mixture gas inside the subchamber 60 combusts, and the flame is blown off from the plurality of communicating holes 66. The mixture gas inside the main combustion chamber 26 begins the SI combustion by using the flame as an ignition point. By the main ignition following the subignition, the mixture gas which remains inside the main combustion chamber 26 combusts instantaneously. Therefore, the combustion speed of the mixture gas inside the main combustion chamber 26 is made faster, and knocking which tends to be caused in the high-speed range can be suppressed.

Relationship Between Engine Speed and Ignition Control

Figure 10:
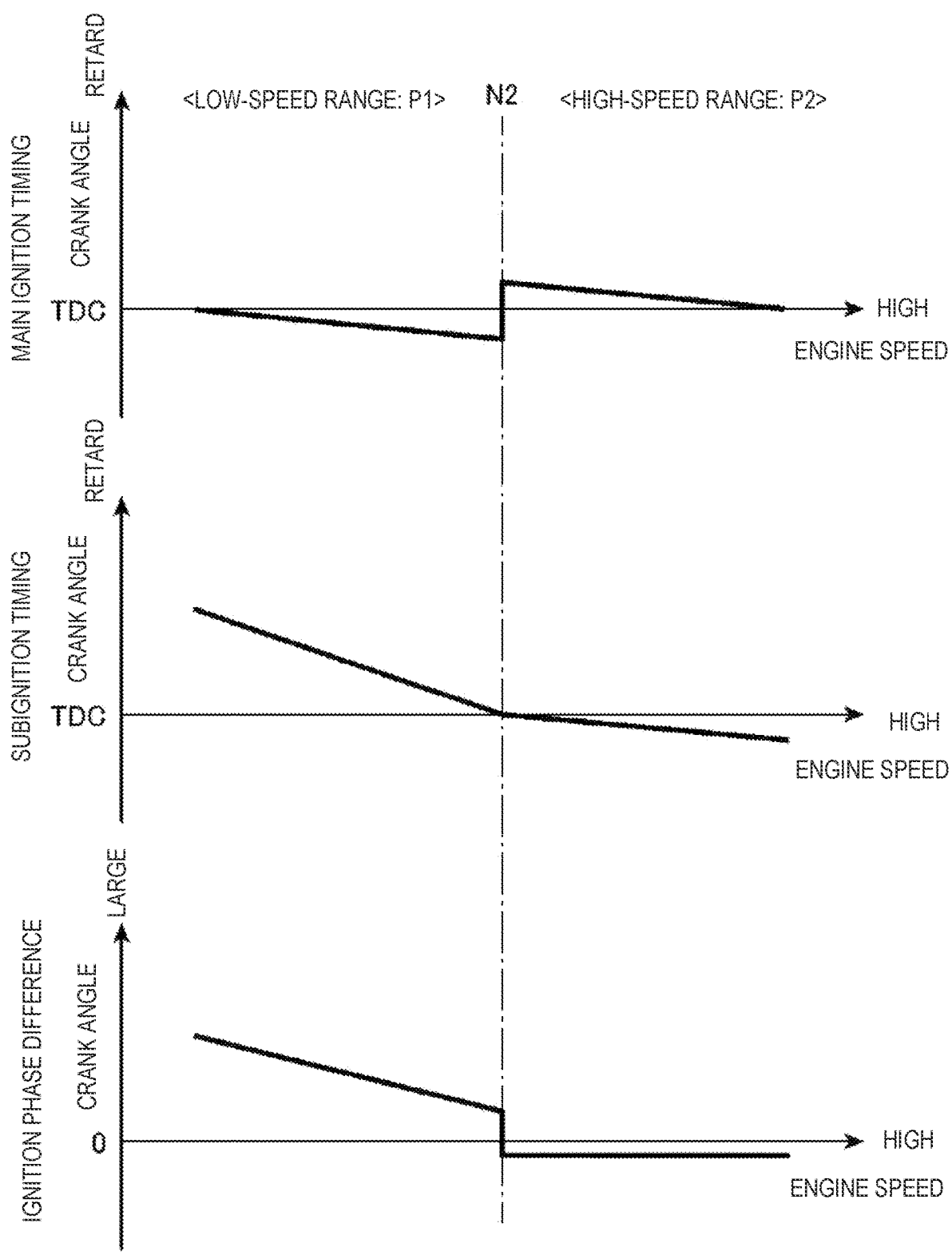
FIG. 10 is a chart illustrating a relationship between an engine speed, and the main ignition timing, the subignition timing, and an ignition phase difference, in the specific range.

FIG. 10 is a chart illustrating a relationship between the engine speed, and the main ignition timing (top graph in FIG. 10), the subignition timing (middle graph), and an ignition phase difference (bottom graph), in the specific range A2H. In FIG. 10, the low-speed range and the high-speed range are classified by using the second speed N2 as the reference engine speed. In each graph, the vertical axis is the crank angle, where the advance side of TDC is compression stroke, and the retard side is expansion stroke. In FIGS. 8 and 9, the example ignition controls at the specific operating point P1 in the low-speed range and the specific operating point P2 in the high-speed range are illustrated. In FIG. 10, a tendency of the ignition control in the entire engine speed range of the specific range A2H, which are performed by the ECU 100, is illustrated. Note that the chart of FIG. 10 illustrates the relationship between each parameter and the engine speed with the fixed engine load.

Since the main ignition becomes the preceding ignition in the low-speed range, the main ignition timing is set in compression stroke. The main ignition timing in the low-speed range is controlled so as to be loosely shifted to the advance side from TDC as the engine speed becomes higher. This control is intended to make the SI combustion start earlier as the engine speed becomes higher to suppress the occurrence of the self-ignition in the main combustion chamber 26.

Since the main ignition in the high-speed range becomes the succeeding ignition, the main ignition timing is set in expansion stroke. That is, at the second speed N2 used as a reversal point of the ignition control, the main ignition timing is shifted stepwisely from the advance side of TDC to the retard side. The main ignition timing in the high-speed range is retarded most at the point of the second speed N2, and it is shifted to the advance side so that it approaches TDC as the engine speed becomes higher.

Since the subignition becomes the succeeding ignition in the low-speed range, the subignition timing is set in expansion stroke. In the low-speed range, the ECU 100 performs a control for retarding the subignition timing more as the engine speed becomes lower. In detail, the subignition timing is set near TDC at the second speed N2, and it is controlled to be shifted to the retard side as the engine speed becomes lower. The pushing force of the piston 24 tends to become weaker and the mixture gas tends to become more difficult to be introduced into the subchamber 60, as the engine speed becomes lower. Thus, by retarding the timing of the subignition as the engine speed becomes lower, the period from the main ignition to the subignition can be extended. Thus, the time for stuffing the mixture gas into the subchamber 60 can fully be secured, and the flame can securely be blown off from the plurality of communicating holes 66.

Since the subignition timing becomes the preceding ignition in the high-speed range, it is set in compression stroke. In the high-speed range, the ECU 100 performs a control for advancing the subignition timing as the engine speed becomes higher. In detail, the subignition timing is set near TDC at the second speed N2, and it is controlled to be shifted to the advance side as the engine speed becomes higher. Knocking tends to occur as the engine speed becomes higher. Therefore, like this example control, if the subignition timing is advanced as the engine speed becomes higher, the SI combustion can be started earlier based on the flame blown off from the subchamber 60. Therefore, the combustion speed of the mixture gas inside the main combustion chamber 26 can further be increased to contribute to the suppression of knocking.

As illustrated in FIGS. 8 and 9, an ignition phase difference dt is a phase difference by the crank angle between the main ignition timing tm and the subignition timing ts. The ignition phase difference dt is set larger as the engine speed becomes lower, in the low-speed range of the specific range A2H. In the low-speed range, the subignition timing ts is retarded as the engine speed becomes lower. In the low-speed range, the main ignition timing tm is also shifted to the retard side as the engine speed becomes lower, but the shifting amount is smaller than the subignition timing ts. Therefore, the ignition phase difference dt becomes larger as the engine speed becomes lower. Note that, in the high-speed range, the ignition phase difference dt becomes substantially constant.

As described above, by setting the ignition phase difference dt larger as the engine speed becomes lower, the time for stuffing the mixture gas into the subchamber 60 can fully be secured according to the engine speed. That is, the increase in the ignition phase difference dt leads to the extension of the period between the main ignition which is the preceding ignition and the subignition which is the succeeding ignition in the low-speed range. Therefore, it becomes easier to acquire the effect of introducing the mixture gas into the subchamber 60 accompanying the combustion inside the main combustion chamber 26.

Modifications

Although one embodiment of the present disclosure is described above, the present disclosure is not limited to the embodiment described above, and may be modified as follows.

(1) In the control in the high-speed range (P2) illustrated in FIGS. 9 and 10, the example based on the control of "Pattern C" is illustrated. When the control of "Pattern A" (only the subignition is performed) is performed, only the subignition timing ts is set. In this case, in order to suppress knocking, the subignition timing illustrated in FIG. 10 may be entirely shifted to the advance side. Further, when the control of "Pattern B" (the subignition and the main ignition are performed at the same timing) is performed, the main ignition timing tm and the subignition timing ts are set to the same timing (the ignition phase difference dt=0).

(2) In the embodiment described above, the cover member 64 of the subignition unit 30 has the semicircular dome shape (FIG. 3), where the three communicating holes 66 (FIG. 4) are formed. The shape of the cover member 64 may be a different shape, such as a truncated cone shape and a rectangular parallelepiped shape. Further, the number and the size of communicating holes 66 may be set suitably. The attached position of the subignition unit 30 is not limited to the position in FIG. 2. For example, the subignition unit 30 may be provided on the intake port 8 side with respect to the tip-end part 28x of the injector 28.

(3) In the embodiment described above, the specific range A2H is set within the second range A2 (the minimum engine speed=N1). Alternatively, the minimum engine speed of the specific range A2H may be extended to the lower speed side of N1. That is, a high-speed part of the third range A3 illustrated in FIG. 6 may be incorporated into the specific range A2H.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine System
22 Cylinder
24 Piston
26 Main Combustion Chamber
28 Injector
30 Subignition Unit
32 Main Spark Plug
52 Cylinder Block
54 Cylinder Head
60 Subchamber
62 Sub spark Plug
64 Cover Member (Partition)
66 Communicating Hole
100 ECU (Controller)
A2H Specific Range (High-Load Range above Reference Load)
P1 Operating Point in Low-speed Range
P2 Operating Point in High-speed Range
N2 Second Engine Speed (Given Reference Engine Speed)
Tq21 Boundary Load (Given Reference Load)
tm Main Ignition Timing
ts Subignition Timing
dt Ignition Phase Difference

What is claimed is:

1. An engine system, comprising:
a cylinder block and a cylinder head that form a cylinder;
a piston reciprocatably accommodated in the cylinder;
a main combustion chamber defined by the cylinder block, the cylinder head, and the piston;
a subchamber that is separated from the main combustion chamber by a partition, and communicates with the main combustion chamber through a communicating hole formed in the partition;
an injector that injects fuel into the main combustion chamber;
a main spark plug that performs main ignition for igniting a mixture gas inside the main combustion chamber;
a subspark plug that performs subignition for igniting the mixture gas inside the subchamber; and
a controller that is electrically connected to, and outputs an electric signal for control to, the injector, the main spark plug, and the subspark plug,
wherein when an engine is operated in a high-load range where an engine load is above a given reference load, the controller is configured to:
in a low-speed range where an engine speed is below a given reference engine speed, control the main spark plug and the sub spark plug so that the subignition is performed after the main ignition; and
in a high-speed range where the engine speed exceeds the reference engine speed, control only the subspark plug to perform the subignition, or control the main spark plug and the subspark plug so that the main ignition is performed at the same timing as or after the subignition.

2. The engine system of claim 1, wherein in the low-speed range, the controller retards the timing of the subignition as the engine speed becomes lower.

3. The engine system of claim 1, wherein in the high-speed range, the controller advances the timing of the subignition as the engine speed becomes higher.

4. The engine system of claim 2, wherein in the high-speed range, the controller advances the timing of the subignition as the engine speed becomes higher.

5. The engine system of claim 4, wherein in the low-speed range, the controller sets an ignition phase difference between the subignition and the main ignition to be larger as the engine speed becomes lower.

6. The engine system of claim 1, wherein in the low-speed range, the controller sets an ignition phase difference between the subignition and the main ignition to be larger as the engine speed becomes lower.

7. The engine system of claim 1, wherein the main spark plug is attached so that an electrode part thereof is located on an intake port side in a ceiling surface of the main combustion chamber, and the subspark plug is attached to a position on an exhaust port side in the ceiling surface of the main combustion chamber.

8. The engine system of claim 2, wherein the main spark plug is attached so that an electrode part thereof is located on an intake port side in a ceiling surface of the main combustion chamber, and the subspark plug is attached to a position on an exhaust port side in the ceiling surface of the main combustion chamber.

9. The engine system of claim 3, wherein the main spark plug is attached so that an electrode part thereof is located on an intake port side in a ceiling surface of the main combustion chamber, and the subspark plug is attached to a position on an exhaust port side in the ceiling surface of the main combustion chamber.

10. The engine system of claim 4, wherein the main spark plug is attached so that an electrode part thereof is located on an intake port side in a ceiling surface of the main combustion chamber, and the subspark plug is attached to a position on an exhaust port side in the ceiling surface of the main combustion chamber.

11. The engine system of claim 5, wherein the main spark plug is attached so that an electrode part thereof is located on an intake port side in a ceiling surface of the main combustion chamber, and the subspark plug is attached to a position on an exhaust port side in the ceiling surface of the main combustion chamber.

12. The engine system of claim 6, wherein the main spark plug is attached so that an electrode part thereof is located on an intake port side in a ceiling surface of the main combustion chamber, and the subspark plug is attached to a position on an exhaust port side in the ceiling surface of the main combustion chamber.

13. The engine system of claim 7, wherein the injector is disposed so that a tip-end part thereof is located at the center of the ceiling surface of the main combustion chamber.

14. The engine system of claim 8, wherein the injector is disposed so that a tip-end part thereof is located at the center of the ceiling surface of the main combustion chamber.

15. The engine system of claim 9, wherein the injector is disposed so that a tip-end part thereof is located at the center of the ceiling surface of the main combustion chamber.

16. The engine system of claim 10, wherein the injector is disposed so that a tip-end part thereof is located at the center of the ceiling surface of the main combustion chamber.

17. The engine system of claim 11, wherein the injector is disposed so that a tip-end part thereof is located at the center of the ceiling surface of the main combustion chamber.

18. The engine system of claim 12, wherein the injector is disposed so that a tip-end part thereof is located at the center of the ceiling surface of the main combustion chamber.

* * * * *